United States Patent
Sawada et al.

(10) Patent No.: US 12,208,749 B2
(45) Date of Patent: Jan. 28, 2025

(54) CAMERA INSTALLATION STRUCTURE FOR INSIDE OF OPERATION ROOM

(71) Applicant: KOBELCO CONSTRUCTION MACHINERY CO., LTD., Hiroshima (JP)

(72) Inventors: Yusuke Sawada, Hiroshima (JP); Fumino Hasegawa, Hiroshima (JP); Hitoshi Sasaki, Tokyo (JP); Yoichiro Yamazaki, Tokyo (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 178 days.

(21) Appl. No.: 18/022,210

(22) PCT Filed: Jul. 21, 2021

(86) PCT No.: PCT/JP2021/027303
§ 371 (c)(1),
(2) Date: Feb. 20, 2023

(87) PCT Pub. No.: WO2022/059343
PCT Pub. Date: Mar. 24, 2022

(65) Prior Publication Data
US 2024/0034247 A1 Feb. 1, 2024

(30) Foreign Application Priority Data
Sep. 16, 2020 (JP) .................. 2020-155689

(51) Int. Cl.
*B60R 11/04* (2006.01)
*E02F 9/08* (2006.01)

(52) U.S. Cl.
CPC ............ *B60R 11/04* (2013.01); *E02F 9/0858* (2013.01)

(58) Field of Classification Search
CPC ......... E02F 9/205; E02F 9/163; E02F 9/0858; B60R 11/04
(Continued)

(56) References Cited

U.S. PATENT DOCUMENTS 5,260,731 A * 11/1993 Baker, Jr. ............. F16M 13/022
396/428
6,116,485 A * 9/2000 Watkins .................. B60R 11/04
396/419

(Continued)

FOREIGN PATENT DOCUMENTS

JP H01-165828 A 6/1989
JP H08-107516 A 4/1996
(Continued)

OTHER PUBLICATIONS

The extended European Search Report dated Nov. 20, 2023 issued in the corresponding EP Patent Application No. 21869030.3.

*Primary Examiner* — Pritham D Prabhakher
(74) *Attorney, Agent, or Firm* — Carrier, Shende & Associates P.C.; Joseph P. Carrier; Fulchand P. Shende

(57) ABSTRACT

There is provided a camera installation structure for inside of operation room that can obtain a camera image with reduced shake to enable remote operation and hardly obstructs rear visual field in a case where an operator boards a working machine. A camera installation structure 10 includes an operation seat 3, a scaffold member 20 disposed in a rear space 4, and mounting portions for mounting the scaffold member 20. The scaffold member 20 includes a plurality of shelves 21, 23, 25, and 27, a camera 50 installed on the fourth shelf 27, and mounting brackets. In a state where the mounting brackets are mounted on the mounting portions, a lens 51 of the camera 50 is disposed at a height (Continued)

position corresponding to a height of eyes of an operator in a case where the operator sits on the operation seat 3.

6 Claims, 5 Drawing Sheets

(58) Field of Classification Search
USPC .................................................. 348/207.99
See application file for complete search history.

(56) References Cited

U.S. PATENT DOCUMENTS

| | | | | |
|---|---|---|---|---|
| 6,231,017 | B1* | 5/2001 | Watkins | B60R 11/04 224/908 |
| 6,315,180 | B1* | 11/2001 | Watkins | B60R 11/04 396/419 |
| 6,445,408 | B1* | 9/2002 | Watkins | B60N 2/879 348/148 |
| 8,678,680 | B1* | 3/2014 | Pelini | F16M 11/06 348/148 |
| 9,075,290 | B1* | 7/2015 | Thieman | F16M 13/022 |
| 9,114,766 | B1* | 8/2015 | Pelini | F16M 13/00 |
| 9,605,415 | B2* | 3/2017 | Edara | G01M 99/005 |
| 9,702,113 | B2* | 7/2017 | Kotaki | B60R 1/26 |
| 9,975,459 | B2* | 5/2018 | Takada | H04R 5/023 |
| 10,857,951 | B2* | 12/2020 | Shain | B60R 11/00 |
| 11,826,115 | B2* | 11/2023 | Freiin Von Kapri | A61B 90/361 |
| 2002/0162867 | A1* | 11/2002 | Watkins | B60R 11/04 224/558 |
| 2003/0057749 | A1* | 3/2003 | Buono | B60R 11/04 297/217.3 |
| 2006/0032996 | A1* | 2/2006 | Wu | B60N 3/004 248/218.4 |
| 2008/0240705 | A1* | 10/2008 | Nazarian | F16M 11/24 396/420 |
| 2016/0076226 | A1 | 3/2016 | Edara et al. | |
| 2016/0312438 | A1 | 10/2016 | Kotaki et al. | |
| 2019/0308502 | A1 | 10/2019 | Yoneyama | |
| 2021/0209799 | A1* | 7/2021 | Sugawara | H04N 13/246 |
| 2022/0079694 | A1* | 3/2022 | Freiin Von Kapri | A61B 90/60 |

FOREIGN PATENT DOCUMENTS

| | | |
|---|---|---|
| JP | H10-277976 A | 10/1998 |
| JP | H11-21951 A | 1/1999 |
| JP | H11-61887 A | 3/1999 |
| JP | 2007-038829 A | 2/2007 |
| JP | 2010-095860 A | 4/2010 |
| JP | 2016-196064 A | 11/2016 |
| JP | 2017-106213 A | 6/2017 |
| WO | 2016/038925 A1 | 3/2016 |
| WO | 2018/131241 A1 | 7/2018 |

* cited by examiner

CAMERA INSTALLATION STRUCTURE FOR INSIDE OF OPERATION ROOM

TECHNICAL FIELD

The present invention relates to a camera installation structure for inside of an operation room, installed inside an operation room of a working machine.

BACKGROUND ART

To enable remote operation, a camera is in some cases installed inside an operation room of a working machine. Various installation structures are adopted for such a camera.

For example, Patent Literature 1 described below discloses that, in a construction machine including a throttle lever, a travelling lever, an operation lever, and the like, a television camera is installed on a driver seat (hereinafter, referred to as "operation seat") so as to be turnable and tiltable. In an embodiment, the television camera is installed at a height position of eyes of the operator on the operation seat, via a base, a pan head, and the like.

Further, Patent Literature 2 described below discloses a remote operation robot that receives a control signal transmitted from a transmitter and operates a working machine by operation means. A camera is mounted on a rear wall of an operation seat of the working machine, via a mounting bracket.

CITATION LIST

Patent Literature

Patent Literature 1: Japanese Patent Laid-Open No. H11-61887
Patent Literature 2: Japanese Patent Laid-Open No. 2016-196064

SUMMARY OF INVENTION

Technical Problem

To suppress quick vibration generated with operation of an engine and travelling of the working machine and to improve ride comfort, the operation seat of the working machine has a structure including a damper, a spring, and the like. Such a structure is designed on the assumption that an operator sits on the operation seat. Therefore, in a case where a weight corresponding to the operator does not act on the operation seat, the operation seat relatively easily oscillates.

In the case of Patent Literature 1 described above, the television camera is installed on the operation seat via the base, the pan head, and the like. Therefore, the weight corresponding to the operator does not act on the operation seat, and the camera easily oscillates. Further, even when the weight corresponding to the operator acts on the operation seat, vibration of the working machine is easily transmitted to the camera via the operation seat, the base, the pan head, and the like. The camera easily oscillates also in this case.

In Patent Literature 2, the camera is mounted on the rear wall of the operation seat of the working machine via the mounting bracket. If a window glass is disposed at an upper part on the rear wall of the operation seat, mounting the mounting bracket is difficult, so that installing the camera is difficult. In this case, for example, a flange-like protruding piece may be provided protruding from a rim of the window on the rear wall, and the mounting bracket may be fixed to the protruding piece by screwing; however, the structure is conspicuous and may obstruct a rear visual field of the operator sitting on the operation seat.

An object of the present invention is to provide a camera installation structure for inside of an operation room that can obtain a camera image or a camera moving image with reduced shake to enable remote operation, and hardly obstructs the rear visual field in the case where the operator boards the working machine.

Solution to Problem

To achieve the above-described object, according to the present invention, a camera installation structure for inside of an operation room, installed inside an operation room of a working machine, includes: an operation seat disposed inside the operation room; a scaffold member for camera installation, disposed in a rear space defined inside the operation room between a rear end of the operation seat and a rear wall of the operation room; and mounting portions provided in the operation room for mounting the scaffold member to the operation room. The scaffold member includes a plurality of shelves disposed in a vertical direction of the rear space, a camera including a lens and installed on at least one of the plurality of shelves, and a mounting bracket fixed to a predetermined position other than a shelf on which the camera is installed and configured to be mounted on the mounting portions. In a state where the mounting bracket is mounted on the mounting portion, and the scaffold member is disposed in the rear space, the lens of the camera is disposed at a height position corresponding to a height of eyes of an operator in a case where the operator sits on the operation seat.

DESCRIPTION OF EMBODIMENT (Embodiment of Camera Installation Structure for Inside of Operation Room)

An embodiment of a camera installation structure for inside of an operation room according to the present invention is described below with reference to FIGS. 1 to 5.

Figure 1:
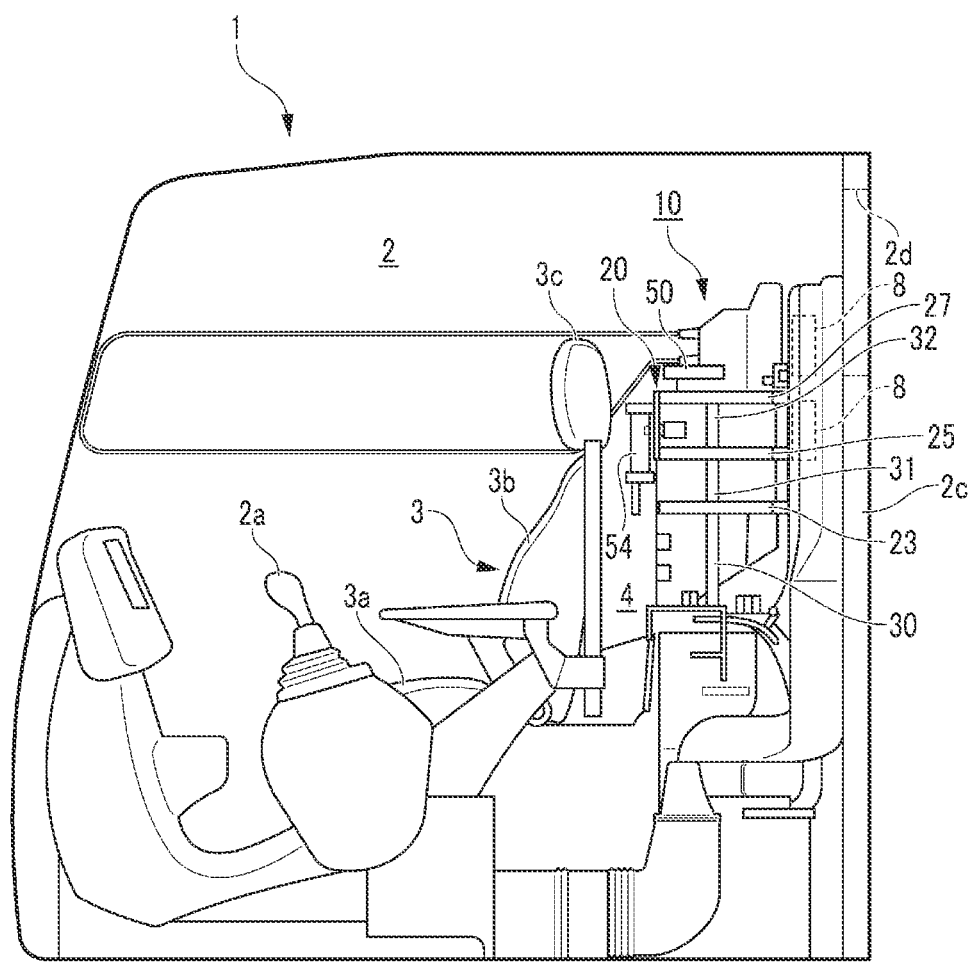
FIG. 1 is a side view illustrating an embodiment of a camera installation structure for inside of an operation room according to the present invention.

As illustrated in FIG. 1, a camera installation structure 10 for inside of an operation room (hereinafter, also simply referred to as "camera installation structure 10") is to install a camera 50 inside an operation room 2 of a working machine 1 such as a hydraulic shovel.

Figure 2:
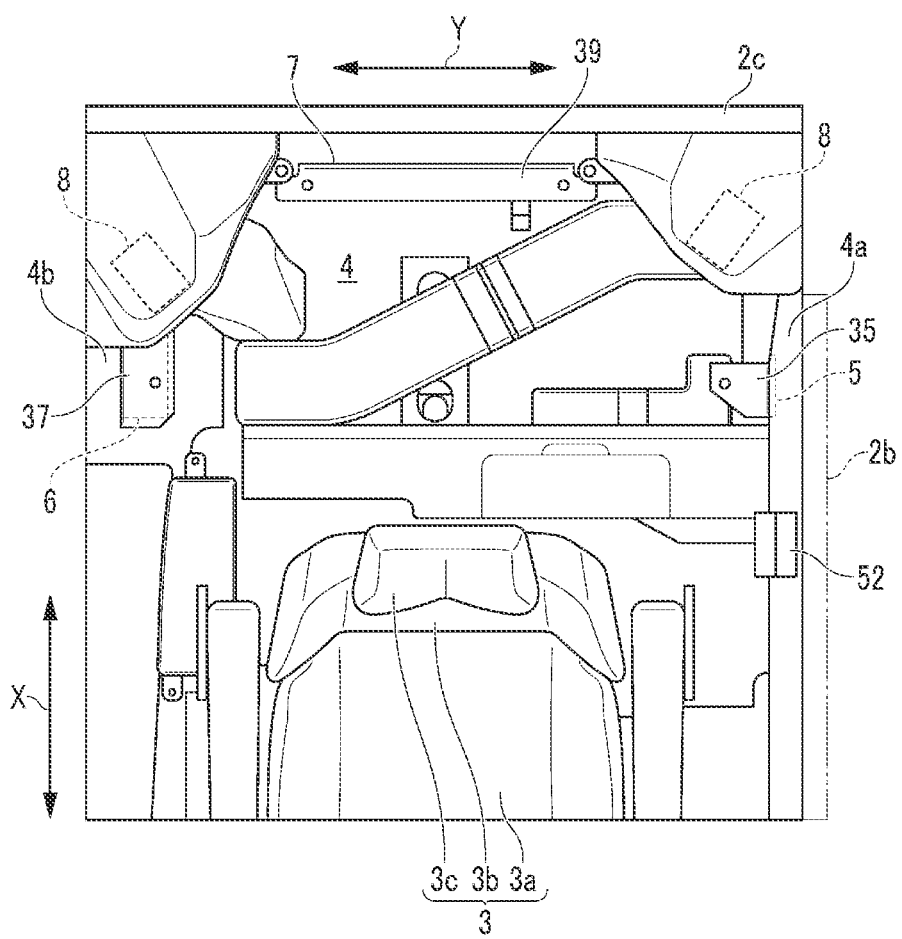
FIG. 2 is a plan view in a state before a scaffold member is disposed in a rear space, in the camera installation structure.

In the following description, as illustrated in FIG. 2, a front-rear direction along a front side and a rear side of the working machine 1 is referred to as a "front-rear direction X". Further, a width direction orthogonal to the front-rear direction X is referred to as a "width direction Y".

Figure 5:
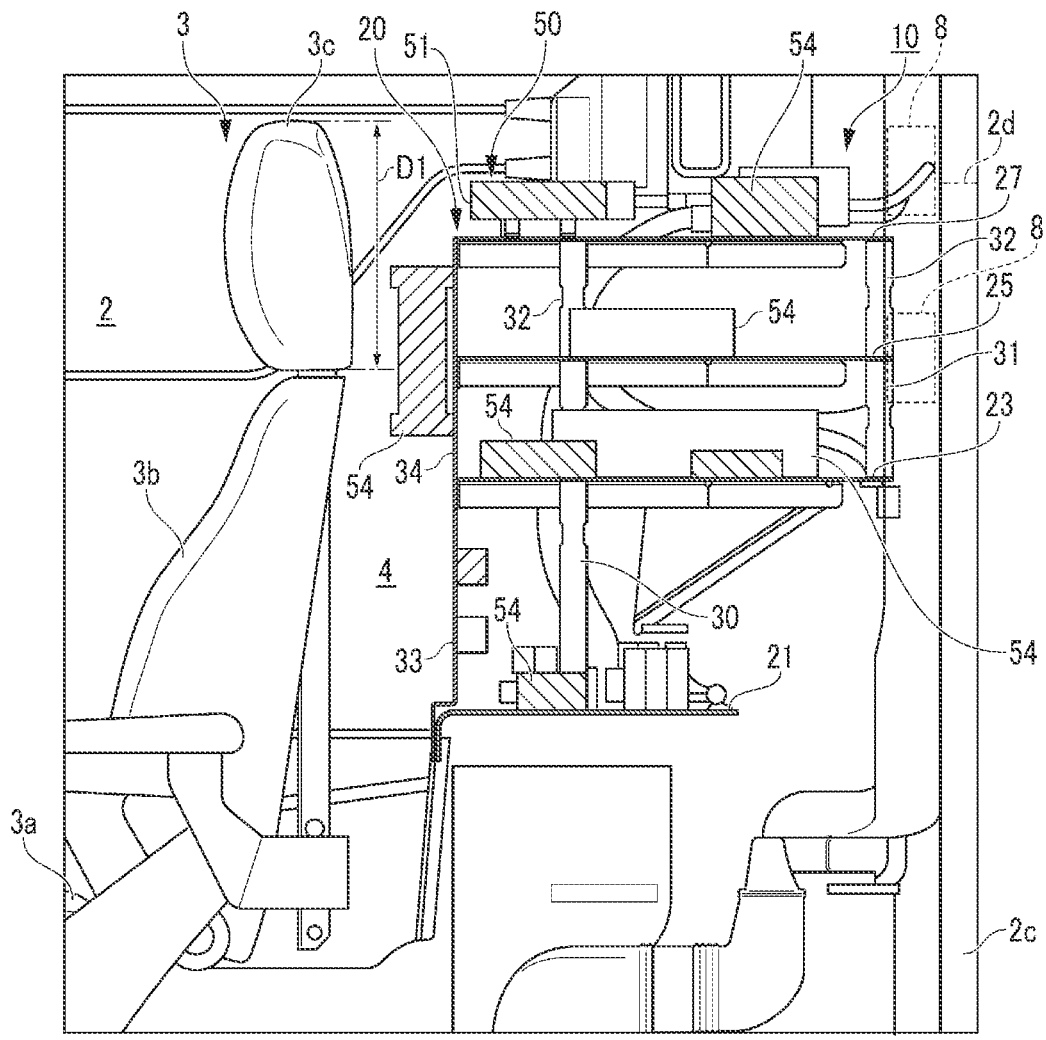
FIG. 5 is an enlarged side view in the state where the scaffold member is disposed in the rear space, in the camera installation structure.

As illustrated in FIG. 1 and FIG. 5, the camera installation structure 10 includes the operation seat 3, a scaffold member 20 for camera installation (hereinafter, also simply referred to as "scaffold member 20") disposed in a rear space 4, and mounting portions (first mounting portion 5, second mounting portion 6, and third mounting portion 7) that are provided in the operation room 2 to mount the scaffold member 20 in the operation room 2. Details thereof are described below.

The operation seat 3 is provided inside the operation room 2. In a case where the working machine 1 is remotely operated, an operator does not sit on the operation seat 3. In a case where the working machine 1 is normally operated, the operator sits on the operation seat 3. Further, a lever 2a to slew an upper slewing body of the working machine 1 and to move a lower travelling body, and unillustrated various kinds of devices to operate the hydraulic shovel are disposed inside the operation room 2.

A attachable or detachable headrest 3c is disposed on an upper part of a rear end of the operation seat 3. The operation seat 3 according to the present embodiment includes a seat 3a, a backrest 3b erected from a rear side of the seat 3a, and the headrest 3c attachable or detachable to an upper part of the backrest 3b. In addition, a rear wall 2c is positioned behind the backrest 3b in the operation room 2. A window 2d is provided on an upper part of the rear wall 2c.

Further, as illustrated in FIG. 2, a left wall portion 4a is provided on one side part of the operation room 2 in the width direction Y, and a right wall portion 4b is provided on the other side part of the operation room 2 in the width direction Y. An openable/closable door 2b is mounted on the left wall portion 4a provided on the one side part of the operation room 2 in the width direction Y.

The rear space 4 is defined inside the operation room 2 between the rear end of the operation seat 3 and the rear wall 2c of the operation room 2. The rear space 4 according to the present embodiment is defined between the backrest 3b of the operation seat 3 and the rear wall 2c of the operation room 2. The scaffold member 20 to install the camera 50 is disposed in the rear space 4. Further, air outlets 8 of an air conditioner are provided inside the operation room 2 (see FIG. 5). In the present embodiment, two air outlets 8 are provided in a vertical direction of the rear space 4.

Various kinds of structures are installed in the rear space 4. In the present embodiment, mounting portions to mount the scaffold member 20 are provided on these structures.

As illustrated in FIG. 2, in the present embodiment, the first mounting portion 5 is provided at a predetermined position of the left wall portion 4a of the operation room 2, on one side part of the rear space 4 in the width direction Y. The second mounting portion 6 is provided at a predetermined position on the right wall portion 4b of the operation room 2, on the other side part of the rear space 4 in the width direction Y. Further, the third mounting portion 7 is provided at a predetermined position on the rear wall 2c of the operation room 2, on a rear side of the rear space 4 in the front-rear direction X. These mounting portions 5, 6, and 7 are positioned below the window 2d provided on the rear wall 2c of the operation room 2. Further, the third mounting portion 7 is provided at a position higher than the first mounting portion 5 and the second mounting portion 6.

Next, a structure of the scaffold member 20 is described in detail.

The scaffold member 20 includes a plurality of shelves disposed in the vertical direction of the rear space 4, the camera 50 that is installed on at least one of the plurality of shelves and includes a lens 51, and mounting brackets that are fixed to predetermined positions other than the shelf on which the camera 50 is installed and are mounted on the mounting portions.

Figure 3:
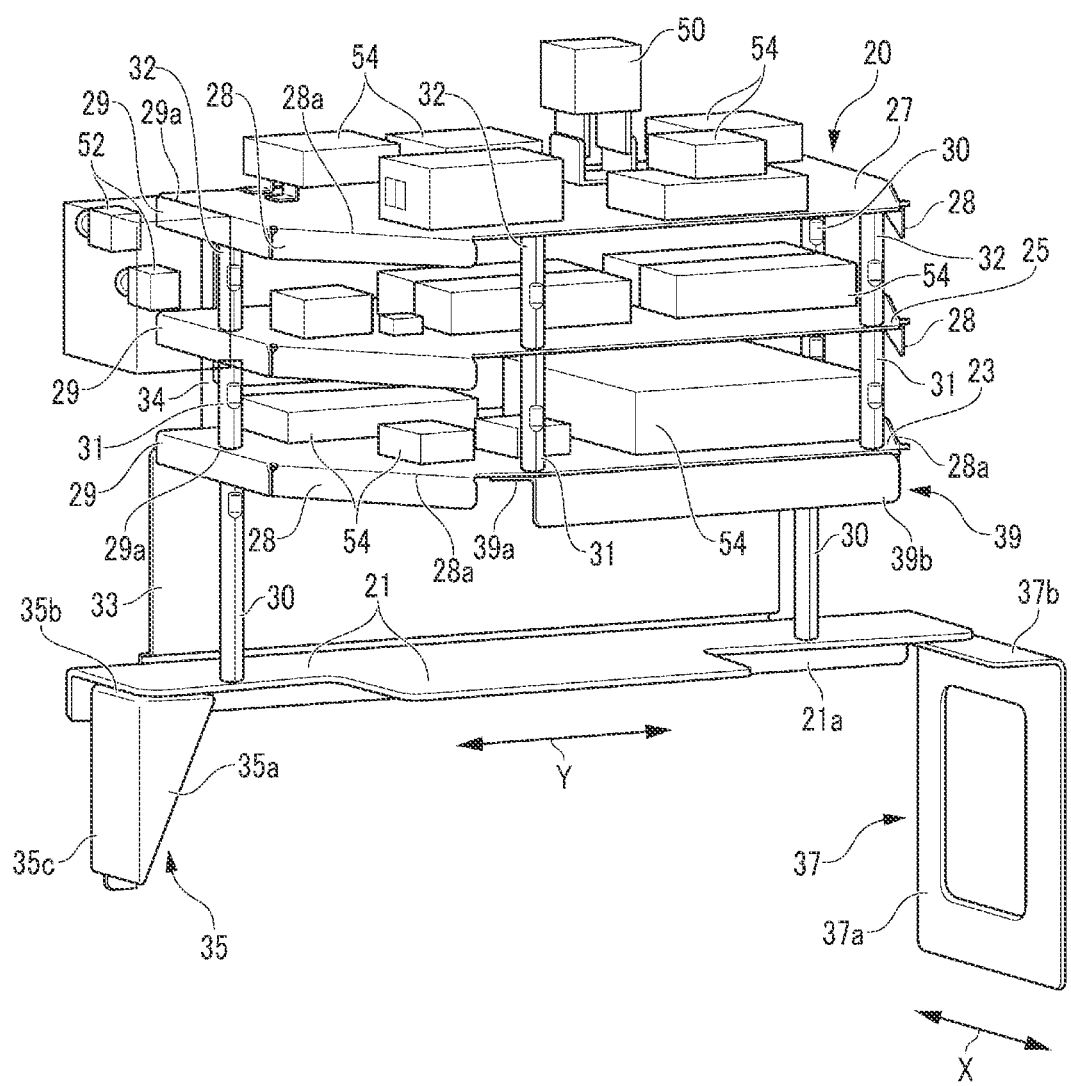
FIG. 3 is a perspective view of the scaffold member constituting the camera installation structure.

As illustrated in FIG. 3, the scaffold member 20 according to the present embodiment includes four shelves 21, 23, 25, and 27, and coupling portions 31, 32, 33, and 34 coupling the plurality of shelves. The four shelves 21, 23, 25, and 27 are disposed so as to be parallel to one another with predetermined intervals in the vertical direction of the rear space 4.

More specifically, among the shelves constituting the scaffold member 20, the first shelf 21 (hereinafter, also referred to as "shelf 21 in first stage") is disposed at a lowermost position, the second shelf 23 (hereinafter, also referred to as "shelf 23 in second stage") is disposed with a predetermined interval above the first shelf 21, the third shelf 25 (hereinafter, also referred to as "shelf 25 in third stage") is disposed with a predetermined interval above the second shelf 23, and the fourth shelf 27 (hereinafter, also referred to as "shelf 27 in fourth stage") is disposed with a predetermined interval above the third shelf 25. The fourth shelf 27 in the fourth stage is a shelf positioned at the uppermost position among the plurality of shelves, and the first shelf 21 in the first stage is a shelf positioned at the lowermost position among the plurality of shelves.

The first shelf 21 in the first stage positioned at the lowermost position has a substantially long plate shape extending long along the width direction Y. The first shelf 21 extends longer than the second shelf 23, the third shelf 25, and the fourth shelf 27, and both side parts of the first shelf 21 in the width direction Y protrude outward from both width-direction side parts of each of the shelves 23, 25, and 27. Further, a bent portion 21a bent downward at a right angle is provided at a front end part of the first shelf 21 in the front-rear direction X, and an extending portion 21b having a predetermined width extends from a predetermined position on a rear end part of the first shelf 21 in the front-rear direction X.

On the other hand, the second shelf 23, the third shelf 25, and the fourth shelf 27 each have substantially the same shape. More specifically, each of the shelves 23, 25, and 27 has a substantially hexagonal plate shape that extends long along the width direction Y and includes chamfered portions 28a at both side parts on the rear side in the front-rear direction X. Further, a bent portion 28 bent downward at a right angle is provided at each of the chamfered portions 28a of the shelves 23, 25, and 27. Further, a bent portion 29 bent downward at a right angle is also provided at each of side parts 29a of the shelves 23, 25, and 27 in the width direction Y.

As illustrated in FIG. 3, the coupling portions 30, 31, and 32 coupling the shelves 21, 23, 25, and 27 with one another each have a substantially columnar shape extending by a predetermined length in the present embodiment. The coupling portions 31 and 32 extend by the same length, and the coupling portions 30 extend longer than the coupling portions 31 and 32.

The paired coupling portions 30 are disposed at positions that are close to both side parts of the first shelf 21 in the width direction Y inside fixed positions of mounting brackets 35 and 37 described below, and correspond to both side parts of the second shelf 23 in the width direction Y. The first shelf 21 and the second shelf 23 are coupled with each other via the plurality of coupling portions 30 by coupling lower end parts of the respective coupling portions 30 to predetermined positions on a front surface side of the first shelf 21 via coupling means such as screws, bolts, and nuts (hereinafter, also simply referred to as "coupling means"), and coupling upper end parts of the respective coupling portions 30 to predetermined positions on a rear surface side of the second shelf 23 via the coupling means.

The paired coupling portions 31 are disposed at positions that correspond to both side parts of the second shelf 23 in the width direction Y and correspond to both side parts of the third shelf 25 in the width direction Y, as well as the paired coupling portions 31 are disposed at positions that correspond to both side parts on the rear end part of the second shelf 23 in the front-rear direction X and correspond to both side parts on the rear end part of the third shelf 25 in the front-rear direction X. The second shelf 23 and the third shelf 25 are coupled with each other via the plurality of coupling portions 31 (four coupling portions 31 in present embodiment) by coupling lower end parts of the respective coupling portions 31 to predetermined positions on a front surface side of the second shelf 23 via the coupling means, and coupling upper end parts of the respective coupling portions 31 to predetermined positions on a rear surface side of the third shelf 25 via the coupling means.

Further, the paired coupling portions 32 are disposed at positions that correspond to both side parts of the third shelf 25 in the width direction Y and correspond to both side parts of the fourth shelf 27 in the width direction Y, as well as the paired coupling portions 32 are disposed at positions that correspond to both side parts on the rear end part of the third shelf 25 in the front-rear direction X and correspond to both side parts on the rear end part of the fourth shelf 27 in the front-rear direction X. The third shelf 25 and the fourth shelf 27 are coupled with each other via the plurality of coupling portions 32 (four coupling portions 32 in present embodiment) by coupling lower end parts of the respective coupling portions 32 to predetermined positions on a front surface side of the third shelf 25 via the coupling means, and coupling upper end parts of the respective coupling portions 32 to predetermined positions on a rear surface side of the fourth shelf 27 via the coupling means.

The coupling portions 30, 31, and 32 coupling the shelves 21, 23, 25, and 27 with one another are disposed such that axial centers thereof orthogonal to the shelves 21, 23, 25, and 27.

Further, as illustrated in FIG. 3, the paired coupling portions 30 coupling the first shelf 21 and the second shelf 23, the paired coupling portions 31 coupling the both width-direction side parts of the second shelf 23 and the both width-direction side parts of the third shelf 25, and the paired coupling portions 32 coupling the both width-direction side parts of the third shelf 25 and the both width-direction side parts of the fourth shelf 27 are at matched positions. Further, the paired coupling portions 31 coupling the both side parts on the rear end part of the second shelf 23 and the both side parts on the rear end part of the third shelf 25, and the paired coupling portions 32 coupling the both side parts on the rear end part of the third shelf 25 and the both side parts on the rear end part of the fourth shelf 27 are at matched positions.

In other words, in the present embodiment, the coupling portions 30, 31, and 32 disposed at corresponding positions on the shelves 21, 23, 25, and 27 are disposed such that the axial centers thereof are coincident with one another in the vertical direction of the scaffold member 20.

Further, the first shelf 21 and the second shelf 23 are coupled with each other by the coupling portion 33 having a plate shape.

More specifically, as illustrated in FIG. 3, the coupling portion 33 that has a long plate shape extending along the width direction Y of the first shelf 21 and the second shelf 23 is disposed between the first shelf 21 and the second shelf 23 on the front side in the front-rear direction X. Further, the coupling portion 33 is disposed such that a surface direction thereof is orthogonal to the first shelf 21 and the second shelf 23. A lower end part of the coupling portion 33 having the long plate shape is coupled with the front end part of the first shelf 21 in the front-rear direction X via the coupling means, and an upper end part of the coupling portion 33 is coupled with the front end part of the second shelf 23 in the front-rear direction X via the coupling means.

The second shelf 23, the third shelf 25, and the fourth shelf 27 are coupled with one another by the coupling portion 34 having a plate shape.

More specifically, as illustrated in FIG. 3, the coupling portion 34 having a rectangular plate shape is disposed on the front side of the second shelf 23, the third shelf 25, and the fourth shelf 27 in the front-rear direction X, on the one side part in the width direction Y. Further, the coupling portion 34 is disposed such that a surface direction thereof is orthogonal to the second shelf 23, the third shelf 25, and the fourth shelf 27. A lower end part, an intermediate part, and an upper end part of the coupling portion 34 having the rectangular plate shape are respectively coupled with the front end part of the second shelf 23, the front end part of the third shelf 25, and the front end part of the fourth shelf 27 via the coupling means.

In the above-described manner, the shelves 21, 23, 25, and 27 of the four stages are coupled by the plurality of coupling portions 30, 31, 32, 33, and 34, thereby constituting the scaffold member 20.

In the camera installation structure 10, the camera 50 is installed on the fourth shelf 27 in the fourth stage positioned at the uppermost position of the rear space 4. Further, the first mounting bracket 35 and the second mounting bracket 37 are fixed to the first shelf 21 in the first stage positioned at the lowermost position of the rear space 4, and the third mounting bracket 39 is fixed to the second shelf 23 in the second stage.

Note that installation of the camera 50 is not limited to the fourth shelf 27, and the camera 50 may be installed on at least one of the plurality of shelves 21, 23, and 25. The mounting brackets 35, 37, and 39 may be fixed to at least one of the other shelves on which the camera 50 is not installed, and the coupling portions 30, 31, 32, and 33.

As illustrated in FIG. 2, the first mounting portion 5 is provided on the left wall portion 4a of the operation room 2, and the first mounting bracket 35 fixed to the first shelf 21 is mounted on the first mounting portion 5. The second mounting portion 6 is provided on the right wall portion 4b of the operation room 2, and the second mounting bracket 37 fixed to the first shelf 21 is mounted on the second mounting portion 6. Further, the third mounting portion 7 is provided on the rear wall 2c of the operation room 2, and the third mounting bracket 39 fixed to the second shelf 23 is mounted on the third mounting portion 7.

The first mounting bracket 35 to be mounted on the first mounting portion 5 is fixed to the one side part of the first shelf 21 in the width direction Y. On the other hand, the second mounting bracket 37 to be mounted on the second mounting portion 6 is fixed to the other side part of the first shelf 21 in the width direction Y. As described above, since the first shelf 21 protrudes outward from the both width-direction side parts of each of the shelves 23, 25, and 27, and the mounting brackets 35 and 37 are fixed to the both width-direction side parts of the first shelf 21. Therefore, these mounting brackets 35 and 37 are positioned outside the coupling portions 30 and 31 constituting the scaffold member 20, in the width direction.

The first mounting bracket 35 includes a rear surface portion 35a having a substantially triangular plate shape, a fixed portion 35b bent at a right angle from the rear surface portion 35a at an upper end part of the rear surface portion 35a, and a mounted portion 35c bent at a right angle from the rear surface portion 35a at one side part of the rear surface portion 35a.

The fixed portion 35b is fixed to the rear surface side on a width-direction one side part of the first shelf 21 via fixing means such as screws, bolts, and nuts (hereinafter, also simply referred to as "fixing means"). As a result, the first shelf 21 and the first mounting bracket 35 are integrated (see FIG. 3). Further, predetermined positions of the mounted portion 35c are mounted on the first mounting portion 5 in the rear space 4 via mounting means such as screws, bolts, and nuts (hereinafter, also simply referred to as "mounting means").

On the other hand, the second mounting bracket 37 includes a mounted portion 37a having a substantially square frame shape, and a fixed portion 37b bent at a right angle from the mounted portion 37a at an upper end part of the mounted portion 37a.

The fixed portion 37b is fixed to the rear surface side on a width-direction other side part of the first shelf 21 via the fixing means. As a result, the first shelf 21 and the second mounting bracket 37 are integrated. Further, predetermined positions of the mounted portion 37a are mounted on the second mounting portion 6 in the rear space 4 via the mounting means.

The third mounting bracket 39 includes a fixed portion 39a having a long plate shape, and a mounted portion 39b bent downward at a right angle from a rear end part of the fixed portion 39a in the front-rear direction X. The third mounting bracket 39 has a substantially L-angle shape as viewed from a side.

The fixed portion 39a is fixed to the rear surface side on the rear end part of the second shelf 23 in the front-rear direction X via the fixing means. As a result, the second shelf 23 and the third mounting bracket 39 are integrated. Further, predetermined positions of the mounted portion 39b are mounted on the third mounting portion 7 in the rear space 4 via the mounting means.

Note that the mounting brackets may be fixed not to the shelves on which the camera 50 is not installed, but to the coupling portions 30, 31, 32, and 33 constituting the scaffold member 20. Alternatively, the mounting brackets may be fixed to the shelves on which the camera 50 is not installed and to the coupling portions without particular limitation.

In the present embodiment, the camera 50 having the lens 51 is installed at a predetermined position in the width direction Y on the front side in the front-rear direction X of the fourth shelf 27 in the fourth stage that is positioned at the uppermost position among the plurality of shelves constituting the scaffold member 20. The camera 50 may be a camera that can capture a still image, a camera that can capture a moving image, or a camera that can capture a still image and a moving image. The camera 50 is installed so as to be able to capture the front side of the operation room 2.

As illustrated in FIG. 3, a switch 52 is installed at a position of the scaffold member 20 adjacent to the door 2b, on the one side in the width direction Y on the front side of the third shelf 25 and the fourth shelf 27 in the front-rear direction X.

The switch 52 enables remote operation of the working machine 1. More specifically, the switch 52 can switch an actual boarding mode in which operation of the working machine 1 by actual operation of the lever 2a and the like is enabled and operation of the working machine 1 by remote operation from an unillustrated remote operation apparatus is disabled, and a remote operation boarding mode in which operation of the working machine 1 by actual operation is disabled and operation of the working machine 1 by remote operation is enabled.

On the plurality of shelves 21, 23, 25, and 27 constituting the scaffold member 20, various members 54 such as a communication apparatus, a control apparatus controlling the camera, the other electric apparatuses, and a power supply supplying electricity to the camera and the like are installed.

More specifically, the members 54 such as an apparatus transmitting an image/video captured by the camera 50 through wireless LAN, a DC-DC converter, a hub for LAN, and an inverter are installed on the uppermost fourth shelf 27. The members 54 such as an IP transmission apparatus and a DC-DC converter are installed on the third shelf 25 in the third stage. The members 54 such as a media converter, a slave controller, a LAN interface converter, and an analog HDMI® converter are installed on the second shelf 23 in the second stage. The members 54 such as a power strip, an adaptor, and relays are installed on the lowermost first shelf 21 (see FIG. 5).

The members 54 installed on the shelves 21, 23, 25, and 27 may be members other than the various kinds of communication apparatus, control apparatus, electric apparatus, and power supply described above, without particular limitation. Further, the members 54 may be installed on the plate-shaped coupling portions 33 and 34.

The members 54 such as a communication apparatus are installed on the coupling portion 33 that is disposed on one side part (position adjacent to switch 52) in the width direction Y, on the front side of the second shelf 23, the third shelf 25, and the fourth shelf 27 in the front-rear direction X.

In the camera installation structure 10, as illustrated in FIG. 5, in a state where the mounting brackets 35, 37, and 39 are mounted on the mounting portions 5, 6, and 7 and the scaffold member 20 is disposed in the rear space 4, the camera 50 is configured such that the lens 51 is disposed at a height position corresponding to a height of eyes in a case where the operator sits on the operation seat 3. Further, in the present embodiment, as described above, in the state where the scaffold member 20 is disposed in the rear space 4, the camera 50 is configured such that the lens 51 is disposed at a position matching with the headrest 3c (see FIG. 5). The scaffold member 20 is disposed in the rear space 4 as described above, for example, in the following manner.

First, the mounted portion 35c of the first mounting bracket 35 is mounted on the first mounting portion 5 in the rear space 4 via the mounting means, and the mounted portion 37a of the second mounting bracket 37 is mounted on the second mounting portion 6 via the mounting means. Further, the mounted portion 39b of the third mounting bracket 39 is mounted on the third mounting portion 7 via the mounting means. As a result, as illustrated in FIG. 2, the mounting brackets 35, 37, and 39 are respectively mounted on the mounting portions 5, 6, and 7 in the rear space 4.

Thereafter, the one side part of the first shelf 21 in the width direction Y is placed on the fixed portion 35b of the first mounting bracket 35, and the other side part of the first shelf 21 in the width direction Y is placed on the fixed portion 37b of the second mounting bracket 37. Further, the rear end part of the second shelf 23 is placed on the fixed portion 39a of the third mounting bracket 39. Further, the fixed portions 35b, 37b, and 39a and respective corresponding placement positions are attached via the fixing means.

As a result, as illustrated in FIG. 5, in the state where the mounting brackets 35, 37, and 39 are respectively mounted on the mounting portions 5, 6, and 7, and the scaffold member 20 is disposed in the rear space 4, the camera 50 is disposed at a position where the lens 51 matches with the headrest 3c. When the headrest 3c is detached from the upper part of the rear end of the operation seat 3, the lens 51 of the camera 50 is disposed at the height position corresponding to the height of eyes in the case where the operator sits on the operation seat 3. As a result, the camera 50 can capture an image/video of the front side of the operation room 2, similar to a visual field of the operator in the case where the operator actually sits on the seat, necessary for remote operation of the working machine 1.

Figure 4:
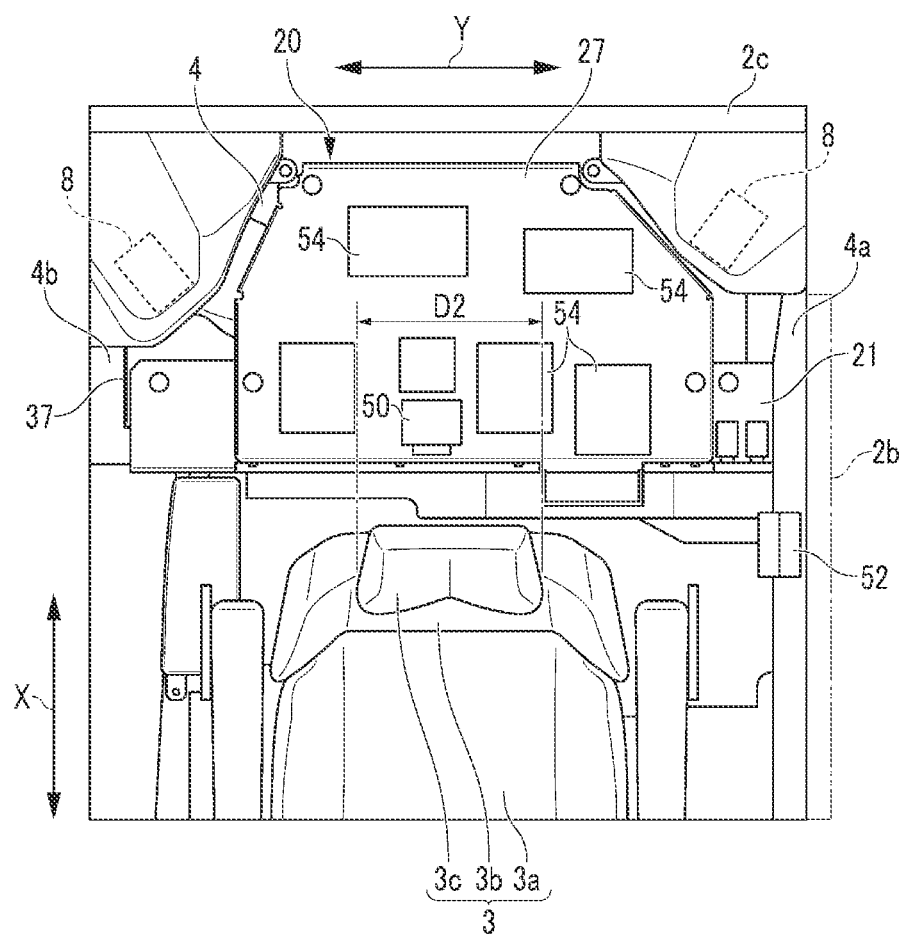
FIG. 4 is a plan view in a state where the scaffold member is disposed in the rear space, in the camera installation structure.

Note that matching of the lens 51 of the camera 50 with the headrest 3c means that the camera 50 is positioned within a height range D1 of the headrest 3c as illustrated in FIG. 5, and the camera 50 is positioned within a width range D2 of the headrest 3c as illustrated in FIG. 4. In a case where the camera 50 is disposed on a side of the headrest 3c by being shifted in the width direction of the headrest 3c, and the camera 50 can capture an image/video of the front side of the operation room 2, it is unnecessary to detach the headrest 3c.

In the case where the headrest 3c is disposed on the operation seat 3, the camera 50 is disposed such that the lens 51 matches with the headrest 3c, by using the headrest 3c as described above. In contrast, in a case where the headrest 3c is not disposed on the operation seat 3, the camera 50 is disposed such that the lens 51 is positioned at the height position corresponding to the height of eyes of the operator in a case where it is assumed that an operator having an average physique sits on the operation seat.

As described above, in the present embodiment, the mounting brackets 35, 37, and 39 are previously respectively mounted on the mounting portions 5, 6, 7 via the mounting means. When the predetermined positions of the first shelf 21 and the second shelf 23 are fixed to the mounting brackets 35, 37, and 39 via the fixing means, the scaffold member 20 is disposed in the rear space 4. Alternatively, the mounting brackets 35, 37, and 39 may be previously fixed to the predetermined positions of the first shelf 21 and the second shelf 23 of the scaffold member 20 via the fixing means (see FIG. 3), and the mounting brackets 35, 37, and 39 may be respectively mounted on the mounting portions 5, 6, and 7 in the rear space 4 via the mounting means, thereby disposing the scaffold member 20 in the rear space 4. The method of disposing the scaffold member 20 in the rear space 4 is not particularly limited.

Further, in the present embodiment, as illustrated in FIG. 5, the scaffold member 20 is configured to be mounted on the mounting portions 5, 6, and 7 via the mounting brackets 35, 37, and 39 such that the uppermost fourth shelf 27 is positioned below the window 2d provided in the rear wall 2c.

Further, in the present embodiment, as illustrated in FIG. 5, the scaffold member 20 is configured to be mounted on the mounting portions 5, 6, and 7 via the mounting brackets 35, 37, and 39 such that at least one of the shelves 21, 23, 25, and 27 and the camera 50 is at a height matching with the air outlets 8 of the air conditioner provided inside the operation room 2 (in this example, lower air outlet 8 matches with third shelf 25 and upper air outlet 8 matches with camera 50 installed on fourth shelf 27). As illustrated in FIG. 2 and FIG. 4, the air outlets 8 of the air conditioner are disposed at both end parts in the width direction Y, of the rear end part of the rear space 4 in the front-rear direction X, and open to send air toward the operation seat 3. The shelf matching with the air outlets 8 of the air conditioner may be the first shelf 21, the second shelf 23, or the fourth shelf 27 other than the third shelf 25, and the air outlets of the air conditioner may match with some of the shelves.

In the present embodiment, the scaffold member 20 described above has the structure in which the shelves 21, 23, 25, and 27 of the four stages are coupled by the plurality of coupling portions 30, 31, 32, 33, and 34; however, the number of shelves constituting the scaffold member may be two, three, or five or more as long as the plurality of (two or more) shelves constitute the scaffold member. Further, the shape and the structure of each of the shelves are not limited to the above-described aspect. Each of the shelves in the present embodiment is formed by appropriately bending a metal plate or the like, but may be formed by, for example, injection molding of a synthetic resin or the like, and is not particular limited. For example, a rubber material or a cushion material to suppress vibration from the working machine 1 may be disposed on each of the shelves, in particular, on the shelf on which the camera 50 is installed.

Further, one (for example, wide columnar coupling portion may be provided at width-direction centers of shelves) or the plurality of coupling portions coupling the shelves may be provided as long as the coupling portions can maintain positional relationship of the shelves adjacently disposed in the vertical direction. Further, in the present embodiment, the coupling portions 30, 31, and 32 are disposed such that the axial centers thereof are coincident with one another; however, the axial centers may be shifted from one another. In the present embodiment, each of the coupling portions 30, 31, 32, 33, and 34 has the substantially columnar shape or the plate shape; however, each of the coupling portions 30, 31, 32, 33, and 34 may have, for example, a cylindrical shape, a prism shape, or an angular cylindrical shape, and the shape of each of the coupling portions is not particularly limited. Further, each of the coupling portions 30, 31, 32, and 33 is made of a metal material, a resin material, or the like, but may be made of, for example, a rubber material or a cushion material that can suppress vibration from the working machine 1. Further alternatively, each of the coupling portions may itself be formed as a spring member such as a coil spring that can suppress vibration, a hydraulic damper, a gas damper, or the like without particular limitation.

In the present embodiment, two mounting brackets 35 and 37 are fixed to the lowermost first shelf 21, and one mounting bracket 39 is fixed to the second shelf 23 above the first shelf 21. Accordingly, the plurality of mounting brackets are fixed to the shelves disposed at different heights. However, the number of mounting brackets fixed to the shelves or the coupling portions and the fixed positions of the mounting brackets are not limited to the above-described aspect. For example, three or four or more mounting brackets may be fixed to the lowermost first shelf 21, and the number of mounting brackets fixed to the shelves or the coupling portions and the fixed positions of the mounting brackets can be appropriately selected based on the number, the arrangement, the shapes, and the like of the mounting portions provided in the rear space. Further, the shape and the structure of each of the mounting brackets are not limited to the above-described aspect, and each of the mounting brackets may have, for example, a simple long plate shape, a columnar shape, or a cylindrical shape. Further, in the present embodiment, each of the mounting brackets is formed by appropriately bending a metal plate or the like, but may be formed by, for example, injection molding of a synthetic resin or the like.

Note that the "fixing means" for the shelves and the mounting brackets, the "mounting means" for the mounting brackets and the mounting portions, or the "coupling means" for the coupling portions and the shelves described above may be, for example, welding, deposition, an adhesive, an adhesive tape, and an industrial fastener (industrial clip) that can be fitted in a single operation, in addition to the screws, the bolts, the nuts, and the like, and are not particularly limited as long as the means can fix, mount, or couple the objects with each other.

(Functional Effects)

Next, functional effects by the camera installation structure 10 having the above-described configuration are described.

In the camera installation structure 10, in the state where the camera 50 is installed on at least one of the plurality of shelves (in this example, fourth shelf 27) of the scaffold member 20, the mounting brackets 35, 37, 39 are respectively mounted on the mounting portions 5, 6, and 7, and the scaffold member 20 is disposed in the rear space 4, the lens 51 of the camera 50 is disposed at the height position corresponding to the height of the eyes of the operator in the case where the operator sits on the operation seat 3. Therefore, the camera 50 can capture an image/video of the front side of the operation room, similar to the visual field of the operator in the case where the operator actually sits on the operation seat 3, which makes it possible to facilitate remote operation of the working machine 1.

Further, the mounting brackets 35, 37, and 39 are fixed to the shelves (in this example, first shelf 21 and second shelf 23) other than the shelf (in this example, fourth shelf 27) on which the camera 50 is installed among the plurality of shelves 21, 23, 25, and 27, and the scaffold member 20 is disposed in the rear space 4 by being mounted on the mounting portions 5, 6, and 7 via these mounting brackets 35, 37, and 39. In other words, since the camera 50 is installed in the rear space 4 unrelated to the operation seat 3, via the scaffold member 20, and vibration from the working machine 1 can be made hard to be transmitted to the camera 50, which makes it possible to obtain a camera image or a camera moving image with reduced shake and/or blur. Note that, in a case where the mounting brackets are fixed to the coupling portions or in a case where the mounting brackets are fixed to the shelves other than the shelf on which the camera is installed and the coupling portions, similar effects are also obtainable.

The mounting brackets 35, 37, and 39 are fixed to the shelves (in this example, first shelf 21 and second shelf 23) other than the shelf (in this example, fourth shelf 27) on which the camera 50 is installed. Therefore, vibration of the working machine 1 transmitted from the mounting portions 5, 6, and 7 provided in the operation room 2 via the mounting brackets 35, 37, and 39 can be made hard to be directly transmitted to the fourth shelf 27 on which the camera 50 is installed, and the camera can be made to be hardly influenced by vibration and the like of the working machine 1. Note that, in the case where the mounting brackets are fixed to the coupling portions or in the case where the mounting brackets are fixed to the shelves other than the shelf on which the camera is installed and the coupling portions, similar effects are also obtainable.

Further, the mounting brackets 35, 37, and 39 are respectively mounted on the mounting portions 5, 6, and 7 provided in the operation room 2. Therefore, even in a case where a glass window is present in the rear wall 2c, the scaffold member 20 can be disposed in the rear space 4.

Further, the scaffold member 20 is disposed in the rear space 4 that is defined inside the operation room 2 between the rear end of the operation seat 3 and the rear wall 2c of the operation room 2. Therefore, the scaffold member 20 is inconspicuous in the operation room 2 and hardly obstructs the rear visual field of the operator in the case where the operator sits on the operation seat 3. Thus, the scaffold member 20 does not hinder operation during normal operation of the working machine 1.

In the present embodiment, the openable/closable door 2b is mounted on the operation room 2, and the switch 52 that enables remote operation of the working machine 1 is installed at the position of the scaffold member 20 adjacent to the door 2b.

According to the above-described aspect, since the switch 52 enabling remote operation of the working machine 1 is installed at the position of the scaffold member 20 adjacent to the door 2b, the operator is not required to get in the operation room 2. For example, a person preparing the working machine 1 can enable remote operation of the working machine 1 by performing a simple work of operating the switch 52 adjacent to the door 2b after opening the door 2b. This makes it possible to improve usability.

In the present embodiment, the scaffold member 20 includes the coupling portions 31, 32, 33, and 34 coupling the plurality of shelves 21, 23, 25, and 27 with one another, and the mounting brackets 35, 37, and 39 are fixed to the other shelves on which the camera 50 is not installed, in this example, to the first shelf 21 and the second shelf 23.

According to the above-described aspect, since the plurality of shelves 21, 23, 25, and 27 are coupled by the coupling portions 31, 32, 33, and 34, the scaffold member 20 can be configured by individually preparing the shelves 21, 23, 25 and 27 and coupling the shelves 21, 23, 25 and 27 by the coupling portions 31, 32, 33, and 34. As a result, flexibility in the shape, the structure, and the like of each of the shelves 21, 23, 25, and 27 is enhanced (in case where plurality of shelves are not coupled by coupling portions, shape, structure, etc. of each of shelves are easily limited because plurality of shelves are bonded and integrated by, for example, adhesive). Note that, in a case where the mounting brackets 35, 37, and 39 are fixed to the coupling portions 31, 32, 33, and 34, effects similar to the above-described effects are also obtainable.

In the present embodiment, the window 2d is provided in the rear wall 2c of the operation room 2, and the mounting portions 5, 6, and 7 are positioned below the window 2d. Therefore, even in the case where the operator sits on the operation seat 3, it is possible to prevent the rear visual field from being blocked by the mounting portions 5, 6, and 7.

In the present embodiment, the scaffold member 20 is configured to be mounted on the mounting portions 5, 6, and 7 via the mounting brackets 35, 37, and 39 such that at least one of the shelves 21, 23, 25, and 27 and the camera 50 matches with the air outlets 8 of the air conditioner provided inside the operation room 2 (in this example, lower air outlet 8 matches with third shelf 25 and upper air outlet 8 matches with camera 50 installed on fourth shelf 27).

According to the above-described aspect, the camera installed on the shelf or the members 54 such as a communication apparatus remotely operating the camera, a control apparatus controlling the camera, the other electric apparatuses, and a power supply supplying electricity to the camera and the like can be cooled using cold air of the air conditioner cooling the inside of the operation room 2. Note that, in the present embodiment, the members 54 installed on the third shelf 25 can be mainly cooled.

In the present embodiment, the camera 50 is installed on the fourth shelf 27 positioned at the uppermost position among the plurality of shelves of the scaffold member 20, the first shelf 21 positioned at the lowermost position has a plate shape long in the width direction Y, and the mounting brackets 35 and 37 are fixed to the both width-direction side parts of the first shelf 21.

According to the above-described aspect, since the camera 50 is installed on the fourth shelf 27 positioned at the uppermost position among the plurality of shelves of the scaffold member 20, the camera 50 can be made to be hardly influenced by vibration and the like of the working machine 1.

Further, since the first mounting bracket 35 and the second mounting bracket 37 are fixed to the both width-direction side parts of the first shelf 21 positioned at the lowermost position among the plurality of shelves of the scaffold member 20, the lower part of the scaffold including the plurality of shelves in the vertical direction can be stably supported by the plurality of mounting brackets 35 and 37. In addition, the scaffold member 20 can be disposed in the rear space 4 without any waste while being made to hardly interfere with various other members such as a wiring and a duct installed in the rear space 4 of the operation room 2.

Further, in the present embodiment, the mounting brackets are fixed to the shelves different in height, among the plurality of shelves constituting the scaffold member 20. In the present embodiment, the first mounting bracket 35 and the second mounting bracket 37 are fixed to the lowermost first shelf 21, and the third mounting bracket 39 is fixed to the second shelf 23 above the first shelf 21.

According to the above-described aspect, the plurality of mounting brackets 35, 37, and 39 fixed to the shelves different in height of the scaffold member 20 are respectively mounted on the plurality of mounting portions 5, 6, and 7 different in height (third mounting portion 7 is provided at position higher than first mounting portion 5 and second mounting portion 6). Thus, it is possible to make the scaffold member 20 hardly fall down and to hold the scaffold member 20 at a stable posture in the rear space 4 (in case where members 54 are unevenly provided on front sides of shelves, loads act on front sides and scaffold member 20 becomes easier to fall down; however, scaffold member 20 can be stably held in this case).

Further, in the present embodiment, the first shelf 21 and the second shelf 23 are coupled with each other by the plate-like coupling portion 33 in addition to the paired coupling portions 30, and the second shelf 23, the third shelf 25, and the fourth shelf 27 are also coupled with one another by the plate-like coupling portion 34. Therefore, it is possible to enhance coupling strength of the first shelf 21 and the second shelf 23, and coupling strength of the second shelf 23, the third shelf 25, and the fourth shelf 27, and to make the structure of the scaffold member 20 strong against rolling. As a result, the scaffold member 20 can be held at the stable and hardly falling-down posture in the rear space 4.

Further, in the present embodiment, the coupling portions 30, 31, and 32 of the shelves 21, 23, 25, and 27 are disposed such that the axial centers thereof are coincident with one another in the vertical direction of the scaffold member 20.

Accordingly, the loads of the shelves (loads including camera 50, members 54, etc.) positioned above are received by the lower coupling portions 30, 31, and 32 that are disposed such that the axial centers thereof are coincident with one another, which makes it possible to withstand the heavy loads. More specifically, the load of the fourth shelf 27 is received by the coupling portions 30, 31, and 32 positioned below the fourth shelf 27, the loads of the fourth shelf 27 and the third shelf 25 are received by the coupling portions 30 and 31 positioned below the third shelf 25, and the loads of the fourth shelf 27, the third shelf 25, and the second shelf 23 are received by the coupling portions 30 positioned below the second shelf 23. As described above, since the loads of the shelves positioned above can be sequentially received by the lower coupling portions 30, 31, and 32 disposed such that the axial centers thereof are coincident with one another, it is possible to withstand the heavy loads.

Further, the loads act on the shelves in the same axis direction. Therefore, the bending load and the like hardly act on the shelves and hardly deforms the shelves (for example, in case where axial centers of coupling portions 32 positioned on third shelf 25 and axial centers of coupling portions 31 positioned below third shelf 25 are shifted from each other, bending load acts on third shelf 25). As a result, the camera 50 and the members 54 can be stably installed on the shelves for a long term.

In the above-described embodiment, a part or all of the mounting portions 5, 6, and 7 are positioned in the rear space 4 inside the operation room 2; however, the mounting portions 5, 6, and 7 are not necessarily positioned in the rear space 4. For example, the mounting portions 5, 6, and 7 may be insertion ports respectively provided on the left wall portion 4a, the right wall portion 4b, and the rear wall 2c, and the mounting brackets 35, 37, and 39 may be inserted into the respective insertion ports, as long as the mounting portions 5, 6, and 7 are provided in the operation room 2.

The present invention is not limited to the above-described embodiment. Various kinds of modified embodiments can be made within the gist of the present invention, and such embodiments are also included in the scope of the present invention.

In the camera installation structure for the inside of the operation room according to the above-described invention, in the state where the mounting brackets are mounted on the mounting portions and the scaffold member is disposed in the rear space, the lens of the camera is disposed at the height position corresponding to the height of the eyes of the operator in the case where the operator sits on the operation seat. Therefore, the camera can capture an image/video of the front side of the operation room, similar to the visual field of the operator in the case where the operator actually sits on the operation seat. This makes it possible to facilitate remote operation of the working machine.

Further, the scaffold member in which the camera is installed on one shelf is disposed in the rear space by mounting the mounting brackets fixed to the predetermined positions other than the shelf on which the camera is installed, on the mounting portions. Therefore, the camera can be installed in the rear space unrelated to the operation seat, via the scaffold member, and vibration from the working machine can be made hard to be transmitted to the camera, which makes it possible to obtain a camera image or a camera moving image with reduced shake and/or blur.

Further, since the mounting brackets are fixed to the predetermined positions other than the shelf on which the camera is installed, it is possible to prevent vibration of the working machine transmitted from the operation room via the mounting brackets, from being directly transmitted to the shelf on which the camera is installed. As a result, the camera can be made to be hardly influenced by vibration and the like of the working machine.

Further, the mounting brackets are mounted on the mounting portions provided in the operation room. Therefore, even in the case where a glass window is present on the rear wall, the scaffold member can be disposed in the rear space.

Further, the scaffold member is disposed in the rear space that is defined inside the operation room between the rear end of the operation seat and the rear wall of the operation room. Therefore, the scaffold member is inconspicuous in the operation room, and hardly obstructs the rear visual field of the operator in the case where the operator sits on the operation seat. Thus, the scaffold member does not hinder operation during normal operation of the working machine.

In the camera installation structure for the inside of the operation room according to the present invention, the operation room preferably includes an openable/closable door, and a switch enabling remote operation of the working machine is preferably installed at a position of the scaffold member adjacent to the door.

According to the above-described aspect, the switch enabling remote operation of the working machine is installed at the position of the scaffold member adjacent to the door. Therefore, the operator is not required to get in the operation room. For example, a person preparing the working machine can enable remote operation of the working machine by performing a simple work of operating the switch adjacent to the door after opening the door. This makes it possible to improve usability.

In the camera installation structure for the inside of the operation room according to the present invention, the scaffold member preferably includes coupling portions coupling the plurality of shelves with one another, and the mounting brackets are preferably fixed to at least one of the other shelves on which the camera is not installed and the coupling portions.

According to the above-described aspect, since the plurality of shelves are coupled by the coupling portions, the scaffold member can be configured by individually preparing the shelves and coupling the shelves by the coupling portions. As a result, flexibility in the shape, the structure, and the like of each of the shelves is enhanced (in case where plurality of shelves are not coupled by coupling portions, shape, structure, etc. of each of shelves are easily limited because plurality of shelves are bonded and integrated by, for example, adhesive). Note that the mounting brackets may be fixed to the coupling portions.

In the camera installation structure for the inside of the operation room according to the present invention, a window is preferably provided in a rear wall of the operation room, and the mounting portions are preferably positioned below the window.

According to the above-described aspect, the mounting portions are positioned below the window provided in the rear wall of the operation room. Therefore, even in the case where the operator sits on the operation seat, it is possible to prevent the rear visual field from being blocked by the mounting portions.

In the camera installation structure for the inside of the operation room according to the present invention, the scaffold member is preferably mounted on the mounting portions via the mounting brackets, to allow at least one of the shelves and the camera to match with an air outlet of an air conditioner provided inside the operation room.

According to the above-described aspect, the scaffold member is mounted on the mounting portions via the mounting brackets such that at least one of the shelves and the camera matches with the air outlet of the air conditioner provided inside the operation room. Therefore, it is possible to cool the camera installed on the shelf or the members such as a communication apparatus remotely operating the camera, a control apparatus controlling the camera, the other electric apparatuses, and a power supply supplying electricity to the camera and the like, by using cold air of the air conditioner cooling the inside of the operation room.

In the camera installation structure for the inside of the operation room according to the present invention, the camera is preferably installed on a shelf positioned at an uppermost position among the plurality of shelves of the scaffold member, and a shelf positioned at a lowermost position preferably includes a plate shape long in a width direction orthogonal to a front-rear direction of the working machine, and the mounting brackets are preferably fixed to both width-direction side parts of the shelf positioned at the lowermost position.

According to the above-described aspect, since the camera is installed on the shelf positioned at the uppermost position among the plurality of shelves of the scaffold member, the camera can be made to be hardly influenced by vibration and the like of the working machine.

Further, since the mounting brackets are fixed to the both width-direction side parts of the shelf positioned at the lowermost position among the plurality of shelves of the scaffold member, the lower part of the scaffold including the plurality of shelves in the vertical direction can be stably supported by the plurality of mounting brackets. In addition, the scaffold member can be disposed in the rear space without any waste while being made to hardly interfere with various other members such as a wiring and a duct installed in the rear space of the operation room.

According to the present invention, the scaffold member in which the camera is installed on one shelf is disposed in the rear space by mounting the mounting brackets fixed to the predetermined positions other than the shelf on which the camera is installed, to the mounting portions. Therefore, the camera can be installed in the rear space unrelated to the operation seat, and vibration from the working machine can be made hard to be transmitted to the camera, which makes it possible to obtain a camera image or a camera moving image with reduced shake and/or blur. Further, the scaffold member is disposed in the rear space. Therefore, the scaffold member is inconspicuous in the operation room, and hardly obstructs the rear visual field of the operator in the case where the operator sits on the operation seat.

REFERENCE SIGNS LIST

1 Working machine
2 Operation room
2a Lever
2b Door
2c Rear wall
2d Window
3 Operation seat
3a Seat
3b Backrest
3c Headrest
4 Rear space
4a Left wall portion
4b Right wall portion
5 First mounting portion
6 Second mounting portion
7 Third mounting portion 8 Air outlet
10 Camera installation structure
20 Scaffold member
21 First shelf
21a Bent portion
21b Extending portion
23 Second shelf
25 Third shelf
27 Fourth shelf
28 Bent portion
28a Chamfered portion
29 Bent portion
29a Side part
30, 31, 32, 33 Coupling portion
35 First mounting bracket
35a Rear surface portion
35b Fixed portion
35c Mounted portion
37 Second mounting bracket
37a Mounted portion
37b Fixed portion
39 Third mounting bracket
39a Fixed portion
39b Mounted portion
50 Camera
52 Switch
54 Member

The invention claimed is:

1. A camera installation structure for inside of operation room, installed inside an operation room of a working machine, the camera installation structure comprising:
an operation seat disposed inside the operation room;
a scaffold member for camera installation, disposed in a rear space defined inside the operation room between a rear end of the operation seat and a rear wall of the operation room; and
mounting portions provided in the operation room for mounting the scaffold member to the operation room, wherein
the scaffold member includes a plurality of shelves disposed in a vertical direction of the rear space, a camera including a lens and installed on at least one of the plurality of shelves, and a mounting bracket fixed to a predetermined position other than a shelf on which the camera is installed and configured to be mounted on the mounting portions, and
in a state where the mounting bracket is mounted on the mounting portions, and the scaffold member is disposed in the rear space, the lens of the camera is disposed at a height position corresponding to a height of eyes of an operator in a case where the operator sits on the operation seat.

2. The camera installation structure for the inside of the operation room according to claim 1, wherein
the operation room includes an openable/closable door, and
a switch enabling remote operation of the working machine is installed at a position of the scaffold member adjacent to the door.

3. The camera installation structure for the inside of the operation room according to claim 1, wherein
the scaffold member includes coupling portions coupling the plurality of shelves with one another, and
the mounting bracket is fixed to at least one of the other shelves on which the camera is not installed and the coupling portions.

4. The camera installation structure for the inside of the operation room according to claim 1, wherein a window is provided in a rear wall of the operation room, and the mounting portions are positioned below the window.

5. The camera installation structure for the inside of the operation room according to claim 1, wherein the scaffold member is mounted on the mounting portions via the mounting bracket, to allow at least one of the shelves and the camera to match with an air outlet of an air conditioner provided inside the operation room.

6. The camera installation structure for the inside of the operation room according to claim 1, wherein
the camera is installed on a shelf positioned at an uppermost position among the plurality of shelves of the scaffold member, and
a shelf positioned at a lowermost position includes a plate shape long in a width direction orthogonal to a front-rear direction of the working machine, and the mounting bracket is fixed to each of both width-direction side parts of the shelf positioned at the lowermost position.

* * * * *